United States Patent
Hahn et al.

(10) Patent No.: US 9,701,804 B2
(45) Date of Patent: Jul. 11, 2017

(54) METHOD FOR PRODUCING FLEXIBLE POLYURETHANE FOAMS

(75) Inventors: Norbert Hahn, Frechen (DE); Sven Meyer-Ahrens, Leverkusen (DE); Gundolf Jacobs, Rösrath (DE); Bernd Dohmen, Monheim (DE)

(73) Assignee: Covestro Deutschland AG, Leverkusen (DE)

( * ) Notice: Subject to any disclaimer, the term of this patent is extended or adjusted under 35 U.S.C. 154(b) by 83 days.

(21) Appl. No.: 13/885,694

(22) PCT Filed: Nov. 18, 2011

(86) PCT No.: PCT/EP2011/070479
§ 371 (c)(1),
(2), (4) Date: Jun. 19, 2013

(87) PCT Pub. No.: WO2012/069385
PCT Pub. Date: May 31, 2012

(65) Prior Publication Data
US 2013/0261203 A1    Oct. 3, 2013

(30) Foreign Application Priority Data
Nov. 22, 2010    (EP) .................... 10192093

(51) Int. Cl.
*C08J 9/12* (2006.01)
*C08G 18/36* (2006.01)
*C08G 18/80* (2006.01)
*C08G 101/00* (2006.01)

(52) U.S. Cl.
CPC .............. *C08J 9/125* (2013.01); *C08G 18/36* (2013.01); *C08G 18/8051* (2013.01); *C08G 2101/0008* (2013.01)

(58) Field of Classification Search
CPC ................................................ C08G 18/8051
USPC ....................................................... 521/159
See application file for complete search history.

(56) References Cited

U.S. PATENT DOCUMENTS

| 3,362,921 A | 1/1968 | Ehrlich et al. |
| 4,254,228 A * | 3/1981 | Kleimann et al. ............ 521/128 |
| 4,263,408 A | 4/1981 | Meyborg et al. |
| 4,609,682 A | 9/1986 | Weber et al. |
| 4,644,017 A | 2/1987 | Haas et al. |
| 8,598,247 B2 * | 12/2013 | Vairo ............................ 521/159 |
| 2002/0090488 A1 | 7/2002 | Kurth et al. |
| 2008/0096995 A1* | 4/2008 | Bedri et al. ................... 521/160 |
| 2010/0266799 A1* | 10/2010 | Koonce et al. ............. 428/36.9 |
| 2011/0233985 A1* | 9/2011 | Usaka et al. ............. 297/452.48 |

FOREIGN PATENT DOCUMENTS

| CA | 1337448 C | 10/1995 |
| DE | 19947191 A1 | 4/2001 |
| EP | 0 007 502 A1 | 2/1980 |
| EP | 0 176 013 A2 | 4/1986 |
| EP | 0180749 A1 | 5/1986 |
| EP | 355000 A1 | 2/1990 |
| EP | 0867422 A2 | 9/1998 |
| WO | WO-2009048927 A1 | 4/2009 |
| WO | WO-2010035679 A1 * | 4/2010 |

OTHER PUBLICATIONS

International Search Report for PCT/EP2011/070479 mailed Feb. 6, 2012.

* cited by examiner

*Primary Examiner* — Melissa Rioja
(74) *Attorney, Agent, or Firm* — K&L Gates LLP

(57) ABSTRACT

The present invention relates to a method for producing flexible polyurethane foams, wherein an isocyanate component (component B) which comprises fatty acid derivatives comprising hydroxyl groups is used as starting substance. The flexible polyurethane foams according to the invention have a bulk density according to DIN EN ISO 3386-1-98 in the range of $\geq 10$ kg/m$^3$ to $\leq 150$ kg/m$^3$, preferably $\geq 20$ kg/m$^3$ to $\leq 70$ kg/m$^3$, and in general their compressive strength according to DIN EN ISO 3386-1-98 is in the range of $\geq 0.5$ kPa to $\leq 20$ kPa (at 40% deformation and 4th cycle). The invention also provides an NCO-terminated prepolymer comprising urethane groups obtainable by reaction of one or more polyisocyanates (B1) with one or more fatty acid derivatives comprising hydroxyl groups (B2).

12 Claims, No Drawings

METHOD FOR PRODUCING FLEXIBLE POLYURETHANE FOAMS

RELATED APPLICATIONS

This application is a national stage application (under 35 U.S.C. §371) of PCT/EP2011/070479, filed Nov. 18, 2011, which claims benefit of European Patent Application No. 10192093.2, filed Nov. 22, 2010, which is incorporated by reference herein.

The present invention relates to a method for producing flexible polyurethane foams, wherein an isocyanate component (component B) which comprises fatty acid derivatives comprising hydroxyl groups is used as starting substance. The flexible polyurethane foams according to the invention have a bulk density according to DIN EN ISO 3386-1-98 in the range of $\geq 10$ kg/m$^3$ to $\leq 150$ kg/m$^3$, preferably $\geq 20$ kg/m$^3$ to $\leq 70$ kg/m$^3$, and in general their compressive strength according to DIN EN ISO 3386-1-98 is in the range of $\geq 0.5$ kPa to $\leq 20$ kPa (at 40% deformation and 4th cycle).

At present, during the synthesis of a polyricinolate from ricinoleic acid and a low molecular weight polyol on an industrial scale, vessel retention times of in some cases more than 80 hours are required in order to obtain a product with an acid value of less than 5 mg KOH/g and a hydroxyl value in the range of 30 to 80 mg KOH/g. A production of polyricinoleic acid esters is described e.g. in EP 0 180 749 A1. This patent application relates to a method for producing optionally microcellular, elastomeric mouldings having self-supporting properties. Here, in closed moulds, a reaction mixture of organic polyisocyanates and solutions of chain extenders in a molecular weight range of 62 to 400 is converted to higher molecular weight polyhydroxy compounds in a molecular weight range of 1800 to 12000 with the assistance of catalysts, internal mould release agents and optionally further auxiliary substances and additives. Internal mould release agents mentioned here are condensation products in a molecular weight range of 900 to 4500 having ester groups, an acid value of less than 5 mg KOH/g and a hydroxyl value of 12.5 to 125 mg KOH/g comprising 3 to 15 moles of ricinoleic acid and one mole of a mono- or polyhydric alcohol in a molecular weight range of 32 to 400 or a total of one mole of a mixture of several such alcohols.

It was the object of the present invention to provide a method for producing flexible polyurethane foams, wherein a polyether polyol based on sustainable raw materials is used and wherein the polyol component should be phase stable. The flexible polyurethane foam should preferably exhibit good tear propagation resistance ("green strength") immediately after production.

Surprisingly, it has been found that the above-mentioned object is achieved by a method for producing flexible polyurethane foams with a bulk density according to DIN EN ISO 3386-1-98 in the range of $\geq 10$ kg/m$^3$ to $\leq 150$ kg/m$^3$, preferably $\geq 20$ kg/m$^3$ to $\leq 70$ kg/m$^3$, and a compressive strength according to DIN EN ISO 3386-1-98 in the range of $\geq 0.5$ kPa to $\leq 20$ kPa (at 40% deformation and 4th cycle) by reaction of component A (polyol formulation) comprising A1 100 parts by weight of conventional polyether polyol,
A2 0.5 to 25 parts by weight, preferably 2 to 5 parts by weight (based on 100 parts by weight of component A1) of water and/or physical blowing agents,
A3 0.05 to 10 parts by weight, preferably 0.2 to 4 parts by weight (based on 100 parts by weight of component A1) of auxiliary substances and additives such as
  a) catalysts,
  b) surface-active additives,
  c) pigments or flame retardants,
A4 0 to 10 parts by weight, preferably 0.05 to 5 parts by weight (based on 100 parts by weight of component A1) of compounds having hydrogen atoms capable of reacting with isocyanates with a molecular weight of 62-399, with component B comprising one or more polyisocyanates (B1) and one or more fatty acid derivatives comprising hydroxyl groups (B2), wherein the production takes place at an index of 50 to 250, preferably 70 to 130 and particularly preferably 75 to 115.

Component A (Polyol Formulation)

The method according to the invention is distinguished by the fact that the polyol formulation is free from fatty acid derivatives comprising hydroxyl groups. The individual components A1 to A4 of the polyol formulation are explained below.

Component A1

Starting components according to component A1 are conventional polyether polyols. Conventional polyether polyols within the meaning of the invention are understood to be compounds which are alkylene oxide addition products of starter compounds with Zerewitinoff active hydrogen atoms, i.e. polyether polyols with a hydroxyl value according to DIN 53240 of $\geq 15$ mg KOH/g to $\leq 80$ mg KOH/g and preferably $\geq 20$ mg KOH/g to $\leq 60$ mg KOH/g.

Starter compounds with Zerewitinoff active hydrogen atoms used for the conventional polyether polyols generally have functionalities of 2 to 6, preferably 3, and the starter compounds are preferably hydroxyfunctional. Examples of hydroxyfunctional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene and condensates of formaldehyde and phenol or melamine or urea comprising methylol groups. Preferably, glycerol and/or trimethylolpropane is used as starter compound.

Suitable alkylene oxides are e.g. ethylene oxide, propylene oxide, 1,2-butylene oxide or 2,3-butylene oxide and styrene oxide. Propylene oxide and ethylene oxide are preferably added to the reaction mixture individually, in a mixture or consecutively. If the alkylene oxides are metered in consecutively, the products produced comprise polyether chains with block structures. Products with ethylene oxide end blocks are characterised e.g. by elevated concentrations of primary end groups, which give the systems an advantageous isocyanate reactivity.

Component A2

As component A2, water and/or physical blowing agents are used. As physical blowing agents, e.g. carbon dioxide and/or highly volatile organic substances are used.

Component A3

As component A3, auxiliary substances and additives are used, such as
  a) catalysts (activators),
  b) surface-active additives (surfactants), such as emulsifiers and foam stabilisers, in particular those with low emission such as e.g. products from the Tegostab®LF series,
  c) additives such as retarders (e.g. acidic substances such as hydrochloric acid or organic acid halides), cell regulators (such as e.g. paraffins or fatty alcohols or dimethyl polysiloxanes), pigments, dyes, flame retardants (such as e.g. tricresyl phosphate), stabilisers against ageing and weathering influences, plasticisers, substances having fungistatic and bacteriostatic action, fillers (such as e.g. barium sulfate, kieselguhr, carbon black or precipitated chalk) and mould release agents.

These optionally incorporated auxiliary substances and additives are described e.g. in EP-A 0 000 389, pages 18-21. Further examples of optionally incorporated auxiliary substances and additives according to the invention and details of the use and mode of action of these auxiliary substances and additives are described in Kunststoff-Handbuch, volume VII, edited by G. Oertel, Carl-Hanser-Verlag, Munich, 3rd edition, 1993, e.g. on pages 104-127.

Preferred as catalysts are aliphatic tertiary amines (e.g. trimethylamine, tetramethyl butanediamine), cycloaliphatic tertiary amines (e.g. 1,4-diaza[2.2.2]bicyclooctane), aliphatic amino ethers (e.g. dimethylaminoethyl ether and N,N,N-trimethyl-N-hydroxyethyl bisaminoethyl ether), cycloaliphatic amino ethers (e.g. N-ethyl-morpholine), aliphatic amidines, cycloaliphatic amidines, urea, derivatives of urea (such as e.g. aminoalkyl ureas, cf. e.g. EP-A 0 176 013, in particular (3-dimethylaminopropylamine) urea) and tin catalysts (such as e.g. dibutyltin oxide, dibutyltin dilaurate, tin octoate).

Particularly preferred as catalysts are
α) urea, derivatives of urea and/or
β) amines and amino ethers, which each comprise a functional group that reacts chemically with isocyanate. The functional group is preferably a hydroxyl group or a primary or secondary amino group. These particularly preferred catalysts have the advantage that they exhibit markedly reduced migration and emission behaviour.

The following may be mentioned as examples of particularly preferred catalysts: (3-dimethylaminopropylamine) urea, 2-(2-dimethylaminoethoxy)ethanol, N,N-bis(3-dimethylaminopropyl)-N-isopropanolamine, N,N,N-trimethyl-N-hydroxyethyl bisaminoethyl ether and 3-dimethylaminopropylamine.

Component A4

As component A4, compounds with at least two hydrogen atoms capable of reacting with isocyanates and a molecular weight of 32 to 399 are optionally used. These are understood to mean compounds having hydroxyl groups and/or amino groups and/or thiol groups and/or carboxyl groups, preferably compounds having hydroxyl groups and/or amino groups, which act as chain extenders or crosslinking agents. These compounds generally have 2 to 8, preferably 2 to 4, hydrogen atoms capable of reacting with isocyanates. For example, ethanolamine, diethanolamine, triethanolamine, sorbitol and/or glycerol can be used as component A4. Further examples of compounds according to component A4 are described in EP-A 0 007 502, pages 16-17.

Component B

Component B within the meaning of the invention is an NCO-terminated prepolymer comprising urethane groups obtainable by reaction of one or more polyisocyanates (B1) with one or more fatty acid derivatives comprising hydroxyl groups (B2). The prepolymer comprising urethane groups according to component B preferably has an NCO content of 5 to 31 wt. %, particularly preferably 12 to 30 wt. % and most preferably 15 to 29 wt. %.

Preferably, component B1 and B2 here are reacted by the methods known per se to the person skilled in the art. For example, components B1 and B2 can be mixed at a temperature of 20 to 80° C., with the formation of the prepolymer comprising urethane groups. In general, the reaction of component B1 and B2 is ended after 30 min to 24 h with the formation of the NCO-terminated prepolymer comprising urethane groups. Activators known to the person skilled in the art for the production of the NCO-terminated prepolymer comprising urethane groups may optionally be used.

Component B1

Suitable polyisocyanates are aliphatic, cycloaliphatic, araliphatic, aromatic and heterocyclic polyisocyanates, as described e.g. by W. Siefken in Justus Liebigs Annalen der Chemie, 562, pages 75 to 136, e.g. those of formula (I)

$$Q(NCO)_n, \quad (I)$$

in which
n=2-4, preferably 2-3,
and
Q represents an aliphatic hydrocarbon residue with 2-18, preferably 6-10 C atoms, a cycloaliphatic hydrocarbon residue with 4-15, preferably 6-13 C atoms or an araliphatic hydrocarbon residue with 8-15, preferably 8-13 C atoms.

For example, these are polyisocyanates as described in EP-A 0 007 502, pages 7-8. Generally preferred are the polyisocyanates that are readily accessible industrially, e.g. 2,4- and 2,6-toluene diisocyanate and any mixtures of these isomers ("TDI"); polyphenyl polymethylene polyisocyanates, as produced by aniline-formaldehyde condensation and subsequent phosgenation ("crude MDI") and polyisocyanates having carbodiimide groups, urethane groups, allophanate groups, isocyanurate groups, urea groups or biuret groups ("modified polyisocyanates"), in particular those modified polyisocyanates that are derived from 2,4- and/or 2,6-toluene diisocyanate or from 4,4'- and/or 2,4'-diphenylmethane diisocyanate. Preferably, at least one compound selected from the group consisting of 2,4- and 2,6-toluene diisocyanate, 4,4'- and 2,4'- and 2,2'-diphenylmethane diisocyanate and polyphenyl polymethylene polyisocyanate ("polynuclear MDI") is used as polyisocyanate, and a mixture comprising 4,4'-diphenylmethane diisocyanate, 2,4'-diphenylmethane diisocyanate and polyphenyl polymethylene polyisocyanate is particularly preferably used as polyisocyanate.

Component B2

Fatty acid derivatives comprising hydroxyl groups within the meaning of the invention are understood as e.g. fatty acids comprising hydroxyl groups, fatty acid esters comprising hydroxyl groups (such as e.g. fatty acid triglycerides comprising hydroxyl groups or fatty acid diglycerides comprising hydroxyl groups), and esters of fatty acids with an alcohol component which encompasses mono- and/or polyhydric alcohols with a molecular mass of ≥32 g/mol to ≤400 g/mol. Fatty acids comprising hydroxyl groups are e.g. castor oil; fatty acid triglycerides comprising hydroxyl groups are e.g. castor oil and lesquerella oil. As fatty acids comprising hydroxyl groups it is also possible to use e.g. ring-opened epoxidised or oxidised fatty acids. Furthermore, hydroxylated fatty acid compounds based on canola oil, soybean oil, rapeseed oil, olive oil and/or sunflower oil and/or those based on oleic and/or linoleic acid can be used as fatty acid derivatives comprising hydroxyl groups.

In a preferred embodiment of the invention, at least one polyricinoleic acid ester is used as fatty acid derivative comprising hydroxyl groups.

Polyricinoleic acid esters are obtainable by the reaction of ricinoleic acid with an alcohol component, which comprises mono- and/or polyhydric alcohols with a molecular mass of ≥32 g/mol to ≤400 g/mol and wherein the reaction is carried out at least partially in the presence of a catalyst.

Polyricinoleic acid esters can be obtained e.g. by polycondensation of ricinoleic acid and mono- or polyhydric alcohols, the polycondensation preferably taking place in the presence of a catalyst. In the method for the production of polyricinoleic acid esters, the quantity of catalyst, based on the total mass of ricinoleic acid and alcohol component, is e.g. in a range of ≥10 ppm to ≤100 ppm. The polyricinoleic acid esters used preferably have an acid value of less, than 25 mg KOH/g and particularly preferably less than 5 mg KOH/g. This can be achieved by terminating the polycondensation when the acid value of the reaction product obtained is less than 25 mg KOH/g, preferably less than 5 mg KOH/g. The polyricinoleic acid esters used preferably have a hydroxyl value of ≥30 mg KOH/g to ≤80 mg KOH/g. The hydroxyl value can be determined according to DIN 53240 and can also be ≥40 mg KOH/g to ≤60 mg KOH/g or ≥45 mg KOH/g to ≤50 mg KOH/g.

Suitable mono- or polyhydric alcohols can be, without being restricted thereto, alkanols, cycloalkanols and/or polyether alcohols. Examples are n-hexanol, n-dodecanol, n-octadecanol, cyclohexanol, 1,4-dihydroxycyclohexane, 1,3-propanediol, 2-methyl-1,3-propanediol, 1,5-pentanediol, 1,6-hexanediol, 1,8-octanediol, sorbitol, pentaerythritol, glucose, neopentyl glycol, diethylene glycol, triethylene glycol, tetraethylene glycol, dipropylene glycol, tripropylene glycol, dibutylene glycol, tripropylene glycol, glycerol and/or trimethylolpropane. 1,3-Propanediol, 1,5-pentanediol, 1,6-hexanediol, neopentyl glycol, diethylene glycol, triethylene glycol, and/or trimethylolpropane are preferred here. The above alcohols have boiling points at which removal together with water of reaction can be avoided, and do not have a tendency towards undesirable side reactions at conventional reaction temperatures.

Suitable catalysts or catalyst precursors for the polycondensation can be Lewis or Brønstedt acids, such as e.g. sulfuric acid, p-toluenesulfonic acid, tin(II) salts or titanium (IV) compounds, such as titanium tetrabutylate or titanium (IV) alcoholates. To calculate the catalyst content, in the case of Brønstedt acids the neutral compound is used as the starting point. With sulfuric acid, for example, the $H_2SO_4$ molecule is taken as the basis. If the catalyst is a Lewis acid, the catalytically active cationic species is used. For example, in the case of tin(II) salts, irrespective of the particular counterion, only the $Sn^{2+}$ cation or, in the case of titanium (IV) compounds, only the $Ti^{4+}$ cation would be taken into account. This approach is advantageous, since the content of metallic species can be determined by means of atom absorption spectroscopy (AAS) without having to know the particular counterion. The method preferably comprises tin(II) salts as catalyst. Particularly preferred here is tin(II) chloride. It has been shown that tin(II) salts do not cause any problems in a subsequent reaction of the polyricinoleic acid ester to form prepolymers comprising urethane groups and are therefore particularly advantageous.

The proportion of the catalyst for the polycondensation, based on the total mass of the ricinoleic acid and the alcohol component, can also lie within a range of ≥20 ppm to ≤80 ppm, preferably ≥40 ppm to ≤60 ppm.

The polycondensation can be carried out at reduced pressure and elevated temperature with simultaneous distillation of the water formed during the condensation reaction. Likewise, it can take place by the azeotrope method in the presence of an organic solvent such as toluene as entrainer or by the carrier gas method, i.e. by driving off the water formed with an inert gas such as nitrogen or carbon dioxide. The reaction temperature during the polycondensation is preferably ≥150° C. to ≤250° C. The temperature can also lie within a range of ≥180° C. to ≤230° C. and more preferably ≥190° C. to ≤210° C. These temperature ranges represent a good balance between the desired rate of reaction and possible undesirable side reactions, such as e.g. water elimination at the OH group of ricinoleic acid.

The reaction is preferably terminated when the acid value of the reaction product obtained is less than 25 mg KOH/g, preferably less than 5 mg KOH/g. This value can be determined in accordance with DIN 53402 and established during the reaction e.g. by taking samples. The termination of the reaction can take place in the simplest case by cooling the reaction mixture, e.g. to a temperature of <50° C.

The molar ratio of ricinoleic acid and the alcohol component is preferably in a range of ≥3:1 to ≤10:1. Particularly preferably, this ratio is ≥4:1 to ≤8:1 and more preferably ≥5:1 to ≤7:1

In a preferred embodiment of the method for the production of the polyricinoleic acid ester, ricinoleic acid and the alcohol component are initially reacted without catalyst. The catalyst is then added when the water formation reaction has come to a stop. The reaction is then continued with catalysis. The fact that the reaction initially runs without catalyst means that no additional external catalyst is used. This does not affect catalysis by the constituents of the reaction mixture of ricinoleic acid and mono- or polyhydric alcohols themselves. The invention thus also provides a method for the production of the flexible polyurethane foams according to the invention, wherein the polyricinoleic acid ester is obtainable by polycondensation of ricinoleic acid and the alcohol component without catalyst at a temperature of ≥150° C. to ≤250° C. until the water formation reaction has come to a stop, subsequent addition of the catalyst and further polycondensation at a temperature of ≥150° C. to ≤250° C. and distilling off the water formed until the acid value of the reaction mixture (polyricinoleic acid ester) is less than 25 mg KOH/g, preferably less than 5 mg KOH/g.

The water formation is considered as having come to a stop when, according to optical inspection of the reaction, no more water is distilled off or when more than 95% of the theoretical quantity of water has been removed from the reaction. This can be determined e.g. by an appropriately equipped distillation receiver, a Dean-Stark apparatus or by monitoring the weight of the distillate formed. To determine the end of the water formation, it is also possible e.g. to monitor the absorption behaviour of COOH and/or OH groups in the NIR range by spectroscopy. The reaction can then be completed up to previously established absorption values.

The fact that the reaction is continued with catalysis after addition of the catalyst means in this context catalysis by added external catalyst. According to this embodiment, a catalyst which is susceptible to hydrolysis, for instance titanium(IV) alcoholate, can be used at a later point in time when at least the majority of the water of reaction has already been separated off. This has no negative effect on the reaction period, since the esterification reaction is self-catalysed in the initial stage by the free COOH groups of the ricinoleic acid units and catalyst is only introduced when the reaction mixture begins to be depleted in COOH groups.

To calculate the catalyst content in the case of Brønstedt acids the neutral compound is used as the starting point. With sulfuric acid, for example, the $H_2SO_4$ molecule is taken as the basis. If the catalyst is a Lewis acid, the catalytically active cationic species is used. For example, in the case of tin(II) salts, irrespective of the particular counterion, only the $Sn^{2+}$ cation or, in the case of titanium(IV) compounds, only the $Ti^{4+}$ cation would be taken into account. This approach is advantageous, since the content of metallic species can be determined by means of atom absorption spectroscopy (AAS) without having to know the particular counterion. The polyricinoleic acid esters used as component B2 generally have a catalyst content of ≥20 ppm to ≤80 ppm and preferably ≥40 ppm to ≤60 ppm.

In a particularly preferred embodiment, the prepolymer comprising urethane groups according to component B has an NCO content of 5 to 31 wt. %, particularly preferably 12 to 30 wt. %, most preferably 15 to 29 wt. % and is obtainable by reaction of B1) polyisocyanate consisting of at least one component selected from the group consisting of 4,4'-diphenylmethane diisocyanate, 2,4'-diphenylmethane diisocyanate, 2,2'-diphenylmethane diisocyanate and polyphenyl polymethylene polyisocyanate with B2) polyricinoleic acid ester obtainable by the reaction of ricinoleic acid with mono- and/or polyhydric alcohols with a molecular mass of ≥32 g/mol to ≤400 g/mol.

To produce the flexible polyurethane foams, the reaction components are reacted by the one-step method which is known per se, wherein mechanical devices are often used, e.g. those described in EP-A 355 000. Details of processing devices which are also suitable according to the invention are described in Kunststoff-Handbuch, volume VII, edited by Vieweg and Höchtlen, Carl-HanserVerlag, Munich 1993, e.g. on pages 139 to 265.

The flexible polyurethane foams can be produced as either moulded or slabstock foams. The invention therefore provides a method for the production of flexible polyurethane foams, the flexible polyurethane foams produced by these methods, the flexible polyurethane slabstock foams or flexible polyurethane moulded foams produced by these methods, the use of the flexible polyurethane foams for the production of mouldings and the mouldings themselves. The flexible polyurethane foams obtainable according to the invention have e.g. the following uses: furniture upholstery, textile inserts, mattresses, car seats, head supports, arm rests, sponges and structural elements.

The index represents the percentage ratio of the quantity of isocyanate actually used to the stoichiometric quantity, i.e. the quantity of isocyanate groups (NCO) calculated for the reaction of the OH equivalents.

$$\text{Index}=[(\text{isocyanate quantity used}):(\text{isocyanate quantity calculated})]\cdot 100 \quad (II)$$

Flexible polyurethane foams within the meaning of the present invention are those polyurethane polymers of which the bulk density according to DIN EN ISO 3386-1-98 is in the range of ≥10 kg/m$^3$ to ≤150 kg/m$^3$, preferably in the range of ≥20 kg/m$^3$ to ≤70 kg/m$^3$ and the compressive strength according to DIN EN ISO 3386-1-98 is in the range of ≥0.5 kPa to ≤20 kPa (at 40% deformation and 4th cycle).

The present invention is explained further on the basis of the following examples.

EXAMPLES

The materials and abbreviations used have the following meaning:
Ricinoleic acid: Oleo Chemie.
Tin(II) chloride: Aldrich
DABCO® (triethylenediamine; 2,2,2-diazabicyclooctane): Aldrich
A1-1: Polyether polyol with an OH value of approx. 28 mg KOH/g, produced by addition of propylene oxide and ethylene oxide in a ratio of 85 to 15 using glycerol as starter with approx. 85 mole % primary OH groups.
A1-2: Polyether polyol with an OH value of approx. 37 mg KOH/g, produced by addition of propylene oxide and ethylene oxide in a ratio of 27 to 73 using glycerol as starter with approx. 83 mole % primary OH groups.
A3-1 Tegostab® B 8681, preparation of organo-modified polysiloxanes, Evonik Goldschmidt
A3-2 Addocat® 105, amine catalyst from Rheinchemie
A3-3 Addocat® 108, amine catalyst from Rheinchemie
A3-4 Urea solution (50 wt. % in water)
A3-5 Tegostab® B 8715LF, preparation of organo-modified polysiloxanes, Evonik Goldschmidt
A3-6 Jeffcat® ZR50, amine catalyst from Huntsman Corp. Europe.
A3-7 Dabco® NE300, amine catalyst from Air Products.
A4-1 Glycerol
A4-2 Diethanolamine
B1-1 Mixture comprising 57 wt. % 4,4'-diphenylmethane diisocyanate, 25 wt. % 2,4'-diphenylmethane diisocyanate and 18 wt. % polyphenyl polymethylene polyisocyanate ("polynuclear MDI") with an NCO content of 32.5 wt. %.

The analyses were carried out as follows:
Dynamic viscosity: MCR 51 rheometer from Anton Paar corresponding to DIN 53019.
Hydroxyl value: based on the standard DIN 53240
Acid value: based on the standard DIN 53402
NCO content: based on the standard DIN 53185
The bulk density was determined according to DIN EN ISO 3386-1-98.
The compressive strength was determined according to DIN EN ISO 3386-1-98 (at 40% deformation and 4th cycle).
The tensile strength and elongation at break were determined according to DIN EN ISO 1798.
The compression sets DVR 50% (Ct) and DVR 75% (Ct) were determined according to DIN EN ISO 1856-2001-03 at 50% and 75% deformation respectively.

Production of the polyricinoleic acid ester (polyricinolate) B2-1:

In a 16000-liter stirrer vessel with distillation columns and an attached partial condenser, 13000 kg ricinoleic acid and 650 kg hexanediol were taken in and heated to 200° C. with stirring. During the heating phase, water of reaction was distilled off under standard pressure. When the reaction temperature was reached, a vacuum was applied. The pressure was reduced to 20 mbar within one hour. Meanwhile, the head temperature was maintained at the level of the water boiling line by means of controlling the partial condenser temperature. At a pressure of 200 mbar after 3.5 hours, 320 g of a 28% solution of tin dichloride (anhydrous) in ethylene glycol were added. At the same time, the partial condenser temperature was fixed at 60° C. In the course of the further reaction, the acid value was monitored: the acid value after a total reaction period of 24 hours was 10 mg KOH/g, after 48 hours 5 mg KOH/g, after 72 hours 3.5 mg KOH/g and after 84 hours 3.0 mg KOH/g. After a reaction period of 84 hours, the reactor contents were cooled to 130° C.

Analysis of resulting polyricinoleic acid ester B2-1:
Hydroxyl value: 37.5 mg KOH/g
Acid value: 3.0 mg KOH/g
Viscosity 850 mPas (25° C.)
Catalyst concentration: 4 ppm Sn in the end product
Production of the NCO terminated prepolymer comprising urethane groups B-1:

1350.0 g of component B1-1 were mixed with 133.0 g of component B2-1 for 2 min with a stirrer and then left to stand for 24 h at 25° C. Then, the resulting product was mixed for 3 min and the NCO content determined.
NCO content: 29.35 wt. %

Production of the NCO terminated prepolymer comprising urethane groups B-2:

1350.0 g of component B1-1 were mixed with 266.1 g of component B2-1 for 2 min with a stirrer and then left to stand for 24 h at 25° C. Then, the resulting product was mixed for 3 min and the NCO content determined.
NCO content: 26.72 wt. %

Production of the NCO terminated prepolymer comprising urethane groups B-3:

1350.0 g of component B1-1 were mixed with 399.2 g of component B2-1 for 2 min with a stirrer and then left to stand for 24 h at 25° C. Then, the resulting product was mixed for 3 min and the NCO content determined
NCO content: 24.50 wt. %

A) Production of Flexible Polyurethane Moulded Foams

In a processing method conventional for the production of flexible polyurethane moulded foams, the feed materials listed in the examples in the following table 1 are reacted with one another by the one-step method. The reaction mixture is introduced into a metal mould having a volume of 9.7 l heated to 60° C. and is demoulded after 5 min. The feed quantity of the raw materials was selected so that a calculated moulding density of about 53 kg/m$^3$ results. Shown in table 1 is the moulding density actually obtained, which was determined in accordance with DIN EN ISO 3386-1-98.

TABLE 1

Production and evaluation of flexible polyurethane moulded foams

|  |  | 1 (Cp.) | 2 (Cp.) | 3 | 4 |
|---|---|---|---|---|---|
| A1-1 | [pts. by wt.] | 82.78 | 86.89 | 91.43 | 90.96 |
| A1-2 | [pts. by wt.] | 2.37 | 2.48 | 2.61 | 2.76 |
| H$_2$O | [pts. by wt.] | 3.03 | 3.18 | 3.34 | 3.53 |
| B2-1 | [pts. by wt.] | 9.46 | 4.97 | — | — |
| A4-2 | [pts. by wt.] | 0.95 | 0.99 | 1.04 | 1.10 |
| A3-5 | [pts. by wt.] | 0.95 | 0.99 | 1.04 | 1.10 |
| A3-6 | [pts. by wt.] | 0.38 | 0.40 | 0.42 | 0.44 |
| A3-7 | [pts. by wt.] | 0.09 | 0.10 | 0.10 | 0.11 |
| Index |  | 90 | 90 | 90 | 90 |
| B1-1 | [MV] | 48.0 |  |  |  |
| B-1 | [MV] |  | 55.4 |  |  |
| B-2 | [MV] |  |  | 63.6 |  |
| B-3 | [MV] |  |  |  | 72.7 |
| GSTR |  | Poor | Medium | Good | Good |
| Bulk density | [kg/m$^3$] | 54.6 | 53.7 | 53.5 | 52.7 |
| Compressive strength | [kPa] | 5.60 | 5.18 | 5.23 | 4.87 |
| Tensile strength | [kPa] | 114 | 112 | 108 | 105 |
| Elongation at break | [%] | 102 | 107 | 104 | 103 |
| Compression set 50% | Ct[%] | 6.9 | 6.4 | 6.2 | 5.5 |
| Compression set 75% | Ct[%] | 8.9 | 9.0 | 8.7 | 7.0 |

Abbreviations:
Cp. = comparative example;
pts. by wt. = parts by weight;
MV = weight ratio of component A to component B at given index and based on 100 parts by weight of component A; in the case of comparative examples 1 and 2, the component B2-1 (polyricinoleic acid ester) used in the polyol formulation is added to component A and thus also to the sum of the parts by weight of component A;
GSTR = measure of the tear propagation resistance of the moulding immediately upon demoulding ("green strength"): "good" = no tearing of the moulding on removal of the moulding from the metal mould; "medium" = defects visible on the surface of the moulding; "poor" = tearing of the moulding on removal of the moulding from the metal mould.

With the respective polyol formulation of comparative examples 1 and 2 (including component B1-1 in the polyol formulation), a phase separation was observed. In the case of comparative example 1, a second phase formed within 2 h and in the case of comparative example 2, a second phase formed within 3 h. In the respective polyol formulation of examples 3 and 4, no phase separation was observed within an observation period of 24 h.

From the flexible polyurethane moulded foams according to the invention (examples 3 and 4), in which the polyricinoleic acid ester was processed in the form of a prepolymer, flexible moulded foams with good tear propagation resistance of the mouldings could be produced immediately upon demoulding. On the other hand, the flexible polyurethane moulded foams of comparative examples 1 and 2 were sensitive upon demoulding and tore and displayed considerable defects at the surface.

B) Production of Flexible Polyurethane Slabstock Foams

In a processing method conventional for the production of polyurethane foams, the feed materials listed in the examples in the following table 2 are reacted with one another by the one-step method.

TABLE 2

Production and evaluation of flexible polyurethane slabstock foams

|  |  | 5 | 6 | 7 (Cp.) | 8 (Cp.) |
|---|---|---|---|---|---|
| A1-1 | [pts. by wt.] | 93.6 | 94.1 | 85.3 | 80.5 |
| B2-1 | [pts. by wt.] | — | — | 9.5 | 14.2 |
| H$_2$O (added) | [pts. by wt.] | 3.7 | 3.4 | 3.0 | 3.0 |
| A3-1 | [pts. by wt.] | 0.1 | 0.1 | 0.0 | 0.0 |
| A3-2 | [pts. by wt.] | 0.3 | 0.3 | 0.3 | 0.3 |
| A3-3 | [pts. by wt.] | 0.1 | 0.1 | 0.0 | 0.0 |
| A3-4 | [pts. by wt.] | 1.2 | 1.1 | 0.9 | 0.9 |
| A4-1 | [pts. by wt.] | 0.6 | 0.5 | 0.5 | 0.5 |
| A4-2 | [pts. by wt.] | 0.5 | 0.5 | 0.4 | 0.4 |
| B1-1 | MV |  |  | 59.4 | 59.5 |
| B-1 | MV | 94.9 |  |  |  |
| B-2 | MV |  | 81.7 |  |  |
| Index |  | 100 | 100 | 100 | 100 |
| Cream time | [s] | 18 | 17 | 17 | 18 |
| Rise time | [s] | 120 | 115 | 115 | 115 |
| Bulk density | [kg/m$^3$] | 45.9 | 41.9 |  |  |
| Compressive strength | [kPa] | 6.76 | 6.03 |  |  |
| Tensile strength | [kPa] | 102 | 98 |  |  |
| Elongation at break | [%] | 107 | 111 |  |  |

Abbreviations:
Cp. = comparative example;
pts. by wt. = parts by weight;
MV = weight ratio of component A to component B at given index and based on 100 parts by weight of component A; in the case of comparative examples 1 and 2, the component B2-1 (polyricinoleic acid ester) used in the polyol formulation is added to component A and thus also to the sum of the parts by weight of component A;
H$_2$O (added) = added quantity of water; since component A3-4 (50% solution of urea in water) also comprises water, the total quantity of water in the polyol formulation is correspondingly higher.

The flexible polyurethane slabstock foams according to the invention (examples 5 and 6), in which polyricinoleic acid ester comprised in component B (prepolymer) was used, could be produced without any problems with good mechanical properties.

In a mixture produced from the constituents of component A of comparative examples 7 and 8 (including component B1-1) (polyol formulation), a phase separation was observed. In the case of comparative examples 7 and 8, a phase separation occurred after 2 h. In a mixture produced from the constituents of component A of examples 5 and 6 (polyol formulation), no phase separation was observed within an observation period of 24 h.

The invention claimed is:
1. A method for producing a flexible polyurethane foam with a bulk density according to DIN EN ISO 3386-1-98 in the range of ≥10 kg/m$^3$ ≤150 kg/m$^3$ and a compressive strength according to DIN EN ISO 3386-1-98 in the range of ≥0.5 kPa to ≤20 kPa, at 40% deformation and 4th cycle, comprising reacting component A which is free from fatty acid derivatives comprising hydroxyl groups and which comprises A1 100 parts by weight of conventional polyether polyol,
A2 2 to 5 parts by weight, based on 100 parts by weight of component A1, of water and/or physical blowing agents,
A3 0.2 to 4 parts by weight, based on 100 parts by weight of component A1, of auxiliary substances and additives,
A4 0.05 to 5 parts by weight, based on 100 parts by weight of component A1, of compounds having hydrogen atoms capable of reacting with isocyanates having a molecular weight of from 62 to 399,
wherein the conventional polyether polyol of component A1 is an alkylene oxide addition product of a starter compound with Zerewitinoff active hydrogen atoms,
with component B, which is obtained by reacting one or more polyisocyanate (B1) and one or more fatty acid derivatives comprising hydroxyl groups (B2), wherein the one or more fatty acid derivatives comprising hydroxyl groups (B2) is one or more polyricinoleic acid ester, wherein the one or more polyricinoleic acid ester is obtained by polycondensation of a monomeric ricinoleic acid and a mono- or polyhydric alcohol in the presence of at least one catalyst selected from the group consisting of sulfuric acid, p-toluenesulfonic acid, tin (II) salts, and titanium(IV) compounds, wherein the molar ratio of monomeric ricinoleic acid and the mono- or polyhydric alcohol is in a range of ≥3:1 to ≤10:1, and
wherein reacting component A with component B takes place at an isocyanate index of 70 to 130.

2. The method of claim 1, wherein the conventional polyether polyol of component A1 is an alkylene oxide addition product obtained by reacting at least one starter compound selected from the group consisting of propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene and condensates of formaldehyde and phenol comprising methylol groups, condensates of formaldehyde and melamine comprising methylol groups, and condensates of formaldehyde and urea comprising methylol groups, with
at least one alkylene oxide selected from the group consisting of ethylene oxide, propylene oxide, 1,2-butylene oxide, 2,3-butylene oxide, and styrene oxide.

3. The method of claim 1, wherein the mono- or polyhydric alcohol is selected from the group consisting of n-hexanol, n-dodecanol, n-octadecanol, cyclohexanol, 1,4-dihydroxycyclohexane, 1,3-propanediol, 2-methyl-1,3-propanediol, 1,5-pentanediol, 1,6-hexanediol, 1,8-octanediol, neopentyl glycol, diethylene glycol, triethylene glycol, tetraethylene glycol, dipropylene glycol, tripropylene glycol, dibutylene glycol, glycerol, and trimethylolpropane.

4. The method of claim 1, wherein the one or more polyricinoleic acid esters have an acid value of less than 4 mg KOH/g.

5. The method of claim 1, wherein the one or more polyricinoleic acid esters have a hydroxyl value of ≥30 mg KOH/g to ≤80 mg KOH/g.

6. The method of claim 1, wherein the one or more polyisocyanate (B 1) is at least one compound selected from the group consisting of 2,4-toluene diisocyanate, 2,6-toluene diisocyanate, 4,4'-diphenylmethane diisocyanate, 2,4'-diphenylmethane diisocyanate, 2,2'-diphenylmethane diisocyanate, and polyphenyl polymethylene polyisocyanate.

7. A flexible polyurethane foam with a bulk density according to DIN EN ISO 3386-1-98 in the range of ≥10 kg/m3 to ≤150 kg/m3 and a compressive strength according to DIN EN ISO 3386-1-98 in the range of ≥0.5 kPa to ≤20 kPa, at 40% deformation and 4th cycle, obtained by the method of claim 1.

8. A method for producing a flexible polyurethane foam with a bulk density according to DIN EN ISO 3386-1-98 in the range of ≥10 kg/m3 to ≤70 kg/m3 and a compressive strength according to DIN EN ISO 3386-1-98 in the range of ≥0.5 kPa to ≤20 kPa at 40% deformation and 4th cycle, comprising reacting component A which is free from fatty acid derivatives comprising hydroxyl groups and which consists of A1 100 parts by weight of conventional polyether polyol,
A2 2 to 5 parts by weight, based on 100 parts by weight of component A1, of water and/or physical blowing agents,
A3 0.2 to 4 parts by weight, based on 100 parts by weight of component A1, of auxiliary substances and additives,
A4 0.05 to 5 parts by weight, based on 100 parts by weight of component A1, of compounds having hydrogen atoms capable of reacting with isocyanates having a molecular weight of from 62 to 399,
wherein the conventional polyether polyol of component A1 is an alkylene oxide addition product of a starter compound with Zerewitinoff active hydrogen atoms,
with component B, which is obtained by reacting one or more polyisocyanates (B1) and one or more fatty acid derivatives comprising hydroxyl groups (B2),
wherein reacting component A with component B takes place at an isocyanate index of 70-130.

9. The method of claim 8, wherein the one or more fatty acid derivative comprising hydroxyl groups (B2) is one or more polyricinoleic acid ester obtained by polycondensation of a monomeric ricinoleic acid and a mono- or polyhydric alcohol in the presence of at least one catalyst selected from the group consisting of sulfuric acid, p-toluenesulfonic acid, tin(II) salts, and titanium(IV) compounds.

10. The method of claim 9, wherein the molar ratio of monomeric ricinoleic acid and the mono- or polyhydric alcohol is in a range of ≥3:1 to ≤10:1.

11. The method of claim 1, wherein the conventional polyether polyol of component A1 is an alkylene oxide addition product obtained by reacting at least one starter compound selected from the group consisting of propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, condensates of formaldehyde and phenol comprising methylol groups, condensates of formaldehyde and melamine comprising methylol groups and condensates of formaldehyde and urea comprising methylol groups, with
at least one alkylene oxide selected from the group consisting of ethylene oxide, propylene oxide, 1,2-butylene oxide, 2,3-butylene oxide, and styrene oxide,
wherein the auxiliary substances and additives of component A3 are selected from the group consisting of (3-dimethylaminopropylamine) urea, 2-(2-dimethylaminoethoxy)ethanol, N,N-bis(3-dimethylaminopropyl)-N-isopropanolamine, N,N,N-trimethyl-N-hydroxyethyl bisaminoethyl ether, and 3-dimethylaminopropylamine, wherein the compounds having hydrogen atoms capable of reacting with isocyanates having a molecular weight of from 62 to 399 of component A4 are selected from the group consisting of ethanolamine, diethanolamine, triethanolamine, sorbitol and glycerol, and wherein the one or more polyisocyanate (B1) is at least one compound selected from the group consisting of 2,4-toluene diisocyanate, 2,6-toluene diisocyanate, 4,4'-diphenylmethane diisocyanate, 2,4'-diphenylmethane diisocyanate, 2,2'-diphenylmethane diisocyanate, and polyphenyl polymethylene polyisocyanate.

12. The method of claim 1, wherein reacting component A with component B takes place at an isocyanate index of 75-115.

* * * * *